(12) United States Patent
Toivanen et al.

(10) Patent No.: US 11,656,239 B2
(45) Date of Patent: May 23, 2023

(54) ACCELERATION TRANSDUCER AND METHOD FOR MEASURING ACCELERATION DATA

(71) Applicant: Treon Oy, Tampere (FI)

(72) Inventors: Jari Toivanen, Tampere (FI); Joni Korppi, Lempäälä (FI); Tero Kontkanen, Tampere (FI); Taija Välilä, Tampere (FI)

(73) Assignee: TREON OY, Tampere (FI)

( * ) Notice: Subject to any disclaimer, the term of this patent is extended or adjusted under 35 U.S.C. 154(b) by 0 days.

(21) Appl. No.: 17/108,542

(22) Filed: Dec. 1, 2020

(65) Prior Publication Data

US 2021/0181226 A1 Jun. 17, 2021

(30) Foreign Application Priority Data

Dec. 11, 2019 (EP) .................................... 19215089

(51) Int. Cl.
*G01P 1/02* (2006.01)
*G01P 15/18* (2013.01)
*G01P 15/08* (2006.01)

(52) U.S. Cl.
CPC ................ *G01P 1/023* (2013.01); *G01P 1/02* (2013.01); *G01P 15/0802* (2013.01); *G01P 15/18* (2013.01)

(58) Field of Classification Search
CPC .. G01P 1/023; G01P 1/02; G01P 15/18; G01P 15/08; G01P 15/0802
See application file for complete search history.

(56) References Cited

U.S. PATENT DOCUMENTS

| | | | |
|---|---|---|---|
| 4,947,690 A * | 8/1990 | Cleveland ............... | G01P 1/023 73/493 |
| 5,473,941 A | 12/1995 | Judd et al. | |
| 6,323,529 B1 | 11/2001 | Nagahara | |
| 7,500,394 B2 * | 3/2009 | Steele ..................... | B60R 11/02 73/493 |
| 8,051,712 B2 * | 11/2011 | Younsi .................. | G01P 15/125 73/493 |
| 9,964,134 B1 * | 5/2018 | Tran ........................ | G01L 5/24 |
| 2002/0164099 A1 * | 11/2002 | Eriksson .................. | G01P 1/02 384/448 |
| 2005/0257614 A1 * | 11/2005 | Schirmer ................ | G01P 15/00 73/504.12 |
| 2007/0040663 A1 * | 2/2007 | Steele .................... | B60R 19/48 340/467 |

(Continued)

OTHER PUBLICATIONS

European Patent Office, Extended European Search Report, Application No. 19215089.4, dated Jun. 12, 2020, 9 pages.

*Primary Examiner* — Helen C Kwok
(74) *Attorney, Agent, or Firm* — Ziegler IP Law Group (57) ABSTRACT

An acceleration transducer for measuring acceleration data of a target device. The acceleration transducer includes a transducer body, an electronic assembly arranged inside the transducer body, a fastener having a cavity, an accelerometer arranged into the cavity, and a communication means connecting the accelerometer with the electronic assembly for transmitting acceleration data of the target device to the electronic assembly. The fastener is arrangeable into the portion of the target device in a manner that the fastener is substantially fitted into the portion of the target device.

15 Claims, 5 Drawing Sheets

(56) References Cited

U.S. PATENT DOCUMENTS

| | | | |
|---|---|---|---|
| 2011/0295546 A1* | 12/2011 | Khazanov | G01P 15/18 |
| | | | 702/141 |
| 2011/0303011 A1* | 12/2011 | Fu | G01N 29/12 |
| | | | 73/579 |
| 2014/0053713 A1* | 2/2014 | Truchsess | H04R 5/027 |
| | | | 84/723 |
| 2015/0241463 A1* | 8/2015 | Kraige | G01H 1/003 |
| | | | 73/514.29 |
| 2017/0082132 A1* | 3/2017 | Ota | F16B 35/00 |
| 2018/0231047 A1* | 8/2018 | Tran | G01L 5/24 |
| 2021/0048317 A1* | 2/2021 | Slama | G01D 5/245 |

* cited by examiner

ACCELERATION TRANSDUCER AND METHOD FOR MEASURING ACCELERATION DATA

TECHNICAL FIELD

The present disclosure relates generally to a sensor for collecting or measuring data; and more specifically, to an acceleration transducer and a method for measuring acceleration data of a target device. The present disclosure also relates to a fastener assembly of an acceleration transducer.

BACKGROUND

Application of sensors can be found in almost all technological domains. One such application includes use of acceleration transducer for collecting motion data associated with a target device. In an example, an acceleration transducer may be used for monitoring health of a rotatory device, such as a pump, a motor and the like. In such instances, an acceleration transducer is required to operate at a high frequency, which may tend to cause error in data collection (or measurement) due to vibration associated with the target device or the acceleration transducer itself. Another problem associated with such acceleration transducer is accommodability or size issue, as increase in size of the accelerometer transducer may give rise to unwanted vibration associated therewith, which may in turn cause error in the data collection.

Conventionally, aforementioned problems are typically solved by building solid and robust transducer bodies. However, building solid and robust transducer bodies require adopting high standards for material selection and structural design for the transducer bodies. Additionally, at least certain amount of structural modification needs to be made to the target device for rigidly mounting the acceleration transducer, which makes the entire process of implementing the acceleration transducer time consuming and cumbersome. In addition to above, the issues of unwanted vibration associated with the acceleration transducer may still exist, because an accelerometer of the acceleration transducer is an integral part of an electronic assembly of the acceleration transducer. Further, the electronic assembly includes various elements, such as battery, integrated printed circuit board and like, which adds to weight and size of the acceleration transducer that may in turn cause unwanted vibration.

Therefore, in light of the foregoing discussion, there exists a need to overcome the aforementioned drawbacks associated with function and implementation of a conventional acceleration transducer.

SUMMARY

The present disclosure seeks to provide an acceleration transducer for measuring acceleration data, temperature (e.g., vibrational temperature, surface temperature), vibration of a target device. The present disclosure also seeks to provide a fastener assembly of an acceleration transducer. The present disclosure further seeks to provide a method for measuring acceleration data, temperature (e.g., vibrational temperature, surface temperature), vibration of a target device using an acceleration transducer. The present disclosure seeks to provide a solution to the existing problem associated with the function and implementation of an acceleration transducer, particularly, unwanted vibration caused by the acceleration transducer itself and mounting of the acceleration transducer on a target device. An aim of the present disclosure is to provide a solution that overcomes at least partially the problems encountered in prior art, and provides efficient data measurement and mounting for an acceleration transducer.

In one aspect, an embodiment of the present disclosure provides an acceleration transducer for measuring an acceleration data of a target device, the acceleration transducer comprising:

a transducer body to accommodate an electric assembly;
the electronic assembly arranged inside the transducer body;
a fastener having a cavity, wherein the fastener is arrangeable into a portion of the target device and the cavity is filled with a filler;
an accelerometer arranged in the cavity, wherein the accelerometer is configured to measure the acceleration data, and wherein the filler is configured to retain the accelerometer therein; and
a communication means connecting the accelerometer with the electronic assembly for transmitting the measured acceleration data of the target device to the electronic assembly.

In another aspect, an embodiment of the present disclosure provides a fastener assembly of an acceleration transducer, the fastener assembly comprising:

a fastener having a cavity, wherein the fastener is arrangeable into a portion of the target device to attach a transducer body of the acceleration transducer into the portion of the target device in a manner that the fastener is substantially fitted into the portion of the target device;
an accelerometer arranged into the cavity to measure an acceleration data; and
a communication means connecting the accelerometer with an electronic assembly of the acceleration transducer for transmitting the measured acceleration data of the target device to the electronic assembly.

In yet another aspect, an embodiment of the present disclosure provides a method for measuring an acceleration data of a target device using an acceleration transducer, the method comprising:

arranging an accelerometer of the acceleration transducer inside a cavity of a fastener filled with a filler for retaining the accelerometer therein;
attaching a transducer body of the acceleration transducer into a portion the target device using the fastener in a manner that the fastener is substantially fitted into the portion of the target device;
measuring with the accelerometer the acceleration data of the target device; and
communicating the measured acceleration data to the electronic assembly via the communication means. Embodiments of the present disclosure substantially eliminate or at least partially address the aforementioned problems in the prior art, and enable in providing efficient data measurement and mounting for an acceleration transducer by arranging an accelerometer of the acceleration transducer inside a cavity of fastener that mounts the acceleration transducer on a target device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an acceleration transducer for measuring an acceleration data of a target device, the acceleration transducer comprising:

a transducer body to accommodate an electronic assembly;
the electronic assembly arranged inside the transducer body;
a fastener having a cavity, wherein the fastener is arrangeable into a portion of the target device and the cavity is filled with a filler;
an accelerometer arranged in the cavity, wherein the accelerometer is configured to measure the acceleration data, and wherein the filler is configured to retain the accelerometer therein; and
a communication means connecting the accelerometer with the electronic assembly for transmitting the measured acceleration data of the target device to the electronic assembly.

In another aspect, an embodiment of the present disclosure provides a fastener assembly of an acceleration transducer, the fastener assembly comprising:

a fastener having a cavity, wherein the fastener is arrangeable into a portion of the target device to attach a transducer body of the acceleration transducer into the portion of the target device in a manner that the fastener is substantially fitted into the portion of the target device;
an accelerometer arranged into the cavity to measure an acceleration data; and
a communication means connecting the accelerometer with an electronic assembly of the acceleration transducer for transmitting the measured acceleration data of the target device to the electronic assembly.

In yet another aspect, an embodiment of the present disclosure provides a method for measuring acceleration data of a target device using an acceleration transducer, the method comprising:

arranging an accelerometer of the acceleration transducer inside a cavity of a fastener filled with a filler for retaining the accelerometer therein;
attaching a transducer body of the acceleration transducer into a portion of the target device using the fastener in a manner that the fastener is substantially fitted into the portion of the target device;
measuring with the accelerometer an acceleration data of the target device; and
communicating the measured acceleration data to the electronic assembly via the communication means.

The present disclosure provides an acceleration transducer for measurement of acceleration data without an error, which may be caused by unwanted vibrations associated with the acceleration transducer itself or the mounting of the acceleration transducer. The acceleration data without the error (or more accurately) may be achieved by introducing or rigidly accommodating accelerometer inside the cavity of the fastener of the acceleration transducer. This avoids requirement of adopting high standards for material selection and structural design for the transducer body, which make the acceleration transducer cost efficient. Further, the acceleration transducer can be easily mounted without making any structural modification in the target device, which makes the entire process of implementing the acceleration transducer time efficient and non-cumbersome.

The acceleration transducer is operable to measure acceleration data of the target device. The target device may be any a device or an object or a system for which the acceleration data can to be calculated using the acceleration transducer.

In an example, the target device may be a rotatory device, such as a pump, a motor, a compressor, pipeline and the like. The acceleration transducer may be arranged (or mounted) into a portion of the target device, such as a fan blade, of such rotatory target devices. The term "into a portion" refers to structure wherein part of the acceleration transducer (namely the fastener) is arranged in a socket (or concave in other words) of a portion of the target device. Further, the acceleration transducer may be employed to remotely measure (or sense or collect) acceleration data of the rotatory device. The acceleration data can be indicative of operational parameter(s), such as velocity data, position data and the like, associated with operational state(s), such as start stage, end stage and intermediate operational stage(s) of the rotatory device. Furthermore, based on such acceleration data a health, i.e. an indication of proper or improper functioning, of the rotatory device can be evaluated. Yet in other example the target device can be a piping system of an industrial facility. In such an example there can be one or more of the accelerator transducers which are arranged into different portions (such as for example every 5 meters of a pipe line) of the target device. Each of the accelerator transducer measure acceleration and the measured accelerations can be used as the acceleration data of the target device. For avoidance of doubt the measured acceleration data of the target device can refer to a measurement done using a single acceleration transducer arranged in a portion of the target device as well as the measurements done using two or more acceleration transducers each arranged in different portions of the target device.

Optionally, the acceleration data may include vibrations, based on which vibrational temperature, surface temperature, and so forth of the target device may be measured. It will be appreciated that the accelerometer transducers are operable to measure dynamic acceleration of the target device when subjected to dynamic motion. Furthermore, the accelerometer transducers convert the dynamic acceleration as voltage signals and further processes to evaluate the vibrational temperature, surface temperature, and so forth for the target device.

Optionally, the acceleration transducer may be used at principle level in conjunction with other target devices belonging to different technological domain, such as in automobiles as proximity sensors, in cell phones as gyroscope, in video games device as motion sensor and so forth.

The acceleration transducer includes the transducer body. The transducer body is a hollow structure. In an example, the transducer body may be a hollow cylindrical structure, a hollow cuboidal structure, a hollow frustum structure and so forth. The transducer body is configured, i.e. includes a shape and dimensions, to primarily accommodate the electronic assembly (which is explained in greater detail herein later) of the acceleration transducer. The transducer body may be made of a suitable material which may include but not limited to aluminium, stainless steels, plastics, or other composite materials. The transducer body is arranged to accommodate the electronic assembly in such a way that the electronic assembly is inside of the hollow structure of the transducer body. Preferably the transducer body does not have openings outside of the acceleration transducer. The transducer body has an opening to the fastener to enable the electronic assembly and the accelerometer to be electrically connected. In preferred embodiment the acceleration transducer is closed structure i.e water tight, hermetically closed transducer.

As mentioned herein above, the electronic assembly is arranged inside the transducer body. According to an embodiment, the electronic assembly comprises a printed circuit board, a processor, a radio transmitter, a memory unit and a power source. Throughout the present disclosure, the term "electronic assembly" refers to an assembly of one or more electronic components that function independently or in communication with each other to perform one or more functions. Optionally, the entire logic structure flows through the electronic assembly. It will be appreciated that the electronic assembly is not limited to the aforementioned components, but may include several other components such as transistors, switches, transmission cables, transmitters, receivers, antennas and the like. However, for the sake of simplicity and clarity, the electronic assembly herein may be defined using the aforementioned components such as the printed circuit board, the processor, the radio transmitter, the memory unit and a power source, unless mentioned otherwise.

The term "processor" relates to a computational element that is operable to respond to and processes instructions that drive the acceleration transducer. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, the one or more individual processors, processing devices and elements are arranged in various architectures for responding to and processing the instructions that drive the acceleration transducer.

Throughout the present disclosure the term "radio transmitter" as used herein refers to a suitable logic, circuitry, and/or interfaces that may be configured to communicate with one or more external devices, such as a radio access network node (e.g. a base station) or a target communication device. The radio transmitter is an electronic device which produces radio waves through one of the pluralities of external elements associated with said radio transmitter. Examples of the external elements associated with said radio transmitter may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The radio transmitter may wirelessly communicate by use of various communication protocols such as, but is not limited to, TCP/IP model and OSI model.

According to an embodiment, the radio transmitter is configured to transmit the measured acceleration data of the target device to an Internet of Things (IoT) gateway. Optionally, the radio transmitter is aided by an external antenna for transmitting the said signals to other locations. Herein, the acceleration transducer is an IoT device configured to send the acceleration data of the target device to the IoT gateway. It will be appreciated that the IoT gateway may receive data from the acceleration transducer and perform one or more functions such as, controlling an operation of the acceleration transducers. In an example, the IoT gateway may receive data from the acceleration transducer to configure or set an operational temperature range, frequency and time for data transmission and the like.

The term "IoT Gateway" as used herein refers to a hardware device housing application software that performs essential tasks such as communication of signals amongst other logical functions. The IoT gateway facilitates the connections between different data sources and destinations. In an example, the IoT gateway facilitates device-to-device communications or device-to-cloud communications. The IoT gateway serves as a bridge between IoT devices in the field, the cloud, and user equipment such as smartphones. The IoT gateway is configured to provide a communication link between the field and the cloud, and may provide offline services and real-time control of devices in the field. Further, the IoT gateway is operable to facilitate communication with legacy or non-internet connected devices, perform data caching, buffering, streaming, data pre-processing, cleansing, filtering and optimization and many other useful functions. The IoT gateway device enables the user to implement web services. In an example, the IoT gateway is configured to transmit the measured accelerometer data to a server for further processing, over a communication channel.

The term "memory unit" used herein refers to a non-volatile medium, such as a memory chip or memory ICs, in which the device can store data (particularly, acceleration data) or software for any duration of time. Optionally, the memory unit may include a volatile medium.

The term "printed circuit board or PCB", as used herein relates to an electronic circuit consisting of thin strips of a conducting material such as copper have been etched from a layer fixed to a flat insulating sheet called a printed circuit board. Further, integrated circuits and other components are attached to the printed circuit board. Optionally, the PCB may employ glass fibre reinforced (fiberglass) epoxy resin with a copper foil bonded on to one or both sides. The PCB is operable to mechanically support and electrically connect the electronic components using a plurality of connecting elements for example tracks, pads among others etched from one or more copper laminate layers and/or between sheet layers of a non-conductive material.

The term "power source", as used herein refers to an electrical device that is operable to supply electrical power to one or more electronic devices herein. In particular, the power source provides power to the processor, the radio transmitter, the accelerometer, the memory unit and/or any other electronic components that are employed in the acceleration transducer. Herein, the power source may be a battery, which may be rechargeable or non-rechargeable in nature. In an example, the battery may be a lithium ion battery or a lithium polymer battery.

The term "fastener" used herein refers to a mechanical component that is configured to mechanically join, link or couple two or more objects, such as the transducer body to the portion of the target device. In general, fasteners are used to create non-permanent joints, i.e. joints that can be removed or dismantled without having an effect on joining components, such as the transducer body to the portion of the target device.

Optionally, the fastener comprises one of a screw, a bolt or a rivet. The bolts and screws include threads at its cylindrical (or shaft) portion, that may be fastened using a nut or may be simply drilled (threadably inserted). Furthermore, in another instance, the rivets are considered as pins that may be punched or pressed using external pressure to mount the accelerometer on the target device. Notably, the bolts, screws, or rivets are configured to firmly secure the transducer body on the target device to withstand external forces such as dynamic forces when the target device is subjected to motion.

The fastener includes the cavity. The term "cavity" relates to a void or space generated in the fastener, particularly in the cylindrical (or shaft) portion thereof. The cavity in the fastener can be made in a number of ways, which includes but not limited to, casting such as squeeze casting wherein the liquid metal is introduced into a die cavity either by direct-pouring or via a simple running system at high pressures to produce the requisite cavity; semi-solid forming, hot metal forming, direct-drilling via a fine drill-bit. It will be appreciated that volume of the cavity have to be large enough to accommodate the accelerometer therein.

The fastener has a cavity and is arrangeable into a portion of the target device. In other words, the fastener is operable to mount the transducer body on the portion of the target device in a manner that the cavity is substantially received by the portion. According to an embodiment, the fastener comprises a first part and a second part having the cavity. Specifically, the cavity runs through both the first and second parts, however, the cavity is substantially (of about 80 to 90%) a part of the second part.

Optionally, the first part extends from (or integral with) the second part. Herein, the first part is referred to a flat portion, i.e. flange portion of the fastener, and the second part is referred to an elongate portion, i.e. the cylindrical (or shaft) portion of the fastener. The first part is coupled to the transducer body and the second part is coupled to the target device, for example into the corresponding socket of the portion of the target device or in an alternative embodiment onto a surface on the target device. In an example, the first part of the fastener may include a recess for receiving an open end of the transducer body. The open end of the transducer body may be couple (i.e. threadably or snap-fit) with the recess of the second portion, thereby closing the open end of the transducer body with the electronic assembly arranged inside the transducer body. It will be appreciated that the transducer body may be detachably coupled to the second part of the fastener to allow repair or maintenance work on of the electronic assembly. Further, in an embodiment, the second part of the fastener may include threads for being threadably coupled (or threadably inserted) into the portion of the target device. Therefore, the cavity (substantially being part of the second part) is substantially received by the portion of the target device.

The accelerometer is arranged in the cavity, wherein the accelerometer is configured to measure the acceleration data. As mentioned herein the cavity is substantially received by the portion of the target device. Accordingly, the accelerometer is received by the portion of the target device. In such instance, the accelerometer is operable to measure acceleration data only associated with the portion of the target device, accordingly the acceleration data will be free from any error that may be caused due to unwanted vibration (or emanating vibrations) cause by the acceleration transducer itself, particularly, caused due to weight or improper mounting of the acceleration transducer.

Optionally, the cavity, is filled with a filler, with the accelerometer arranged therein, wherein the filler is to configured to retain the accelerometer therein. This enables in rigidly holding or retaining the accelerometer in place inside the cavity, which in turn further enables in measuring error free acceleration data for the target device. In other words, the filler used herein refers to a reinforcement material filled inside the cavity to retain the accelerometer therein, and minimize the unwanted vibration which may be caused by the movement of the accelerometer. Furthermore, the filler can sustain the dynamic movement of the accelerometer when the target device, for example such as pumps, motors, and compressors, are in use. In higher temperatures the filler material can be selected to allow or resist thermal transfer from the target device to the accelerometer. The filler material may include but not limited to epoxy-based resins, metal or polycrystalline metal such as polycrystalline germanium, reinforced fibre, plastics etc. Alternatively, the filler may include soft elastomer materials, thus avoiding possible reliability problems with hard filler material. In an example, the soft material may include stiff grease or silicone elastomers. Preferably the filler is selected from a material which is not flexible i.e. rigid. This way the accelerometer which is embedded inside of the filler can measure movements of the fastener (and therefore the target device) precisely. Rigid material is a material which can keep the accelerometer relative position same in respect to a fastener within target tolerances. The target tolerance of allowed movement can be determined by selecting a target measurement accuracy and for example by used analogue to digital converters (i.e. no need to have tolerance less than least significant bit).

According to an embodiment, the accelerometer is a capacitive MEMS (Micro-Electro-Mechanical Systems) accelerometer. Alternatively, the accelerometer may be one of a piezoresistive accelerometer or a piezoelectric accelerometer. Further, it will be appreciated that the accelerometer is configured, i.e. includes a shape and dimensions, so that the accelerometer can be suitably accommodated inside the cavity.

The communication means connecting the accelerometer with the electronic assembly. The communication means is generally a connection medium operable to connect devices or components via a physical link. Optionally, the communication means comprises at least one of a flexible printed circuit board or a flexible wire. The flexible printed circuit boards (PCB) or the flexible wire serves the advantages of light weight, thinness and flexibility. In an example, the substrate material for flexible PCB includes polyimide (PI) film and polyester (PET) film. Also, the substrate material for flexible PCB may include a polymer film such as polyethylene naphthalate (PEN), Polytetrafluoroethylene (PTFE), aramid and so forth. Flexible wires may be for example based on thin, preferably copper wires, being a single, for example cylindrical, flexible strand or rod of metal. In an example a wire comes in solid core, stranded, or braided forms. Although circular in cross-section, wire can be made in square, hexagonal, flattened rectangular, or other cross-sections. The communication means spaces apart the accelerometer from the electronic assembly. Accordingly, the accelerometer can measure error free data, i.e. the error which may be caused by the unwanted vibration of the electronic assembly. In other words, the accelerometer is independent of the movement of the electronic assembly due to the communication means arranged there between.

The communication means connects the accelerometer with the electronic assembly for transmitting measured acceleration data of the target device to the electronic assembly. The communication means is operable to act as a data communication pathway between the accelerometer and the electronic assembly and between the electronic assembly and the accelerometer. In other words, the communication means is operable to connect the accelerometer with the electronic assembly to enable the transmission of measured acceleration data of the target device to the electronic assembly for further processing of said acceleration data. As mentioned herein above, in operation, the measured acceleration data may be further transmitted to the IoT gateway from the acceleration transducer.

According to an embodiment, the electronic assembly may include an additional accelerometer, other than accelerometer accommodated in the cavity, which is accommodated in the transducer body. In other words, the additional accelerometer is part of the electronic assembly. Further, in operation, both accelerometers can measure acceleration data, temperature, vibration and so forth. Therefore, if the measured data (e.g. vibration, temperature) of the two accelerometers start to differ suddenly, then an alert may be sent to the IoT gateway to indicate potential fault/error situation in the target device.

In an embodiment, the acceleration transducer is operable at a higher temperature, for example, the accelerometer (accommodated in the cavity) may operate at a temperature above 100 degrees, however, the electronic assembly may operate at a temperature below 100 degrees. This way conventional electronics with no high temperature requirements, can be used in the electronic assembly. This is particularly important if the power source of the electronic assembly is a battery. For example Lithium-ion battery maximum operating temperature is 50 degrees Celsius. Therefore in some embodiments the filler material is selected to be have low thermal conductivity. Thermal conductivity of the filler could be less than 1 W/m/K or for example 0.1 W/m/K or 0.01 W/m/K (watt/meter/Kelvin).

The present disclosure also relates to the fastener assembly of the acceleration transducer, as described above. Various embodiments and variants disclosed above apply mutatis mutandis to the fastener assembly.

The present disclosure further relates to the method for measuring acceleration data of the target device using the acceleration transducer, as described above. Various embodiments and variants disclosed above apply mutatis mutandis to the method.

Optionally, the method further comprises transmitting the measured acceleration data to an IoT gateway.

DETAILED DESCRIPTION OF THE DRAWINGS

Figure 1:
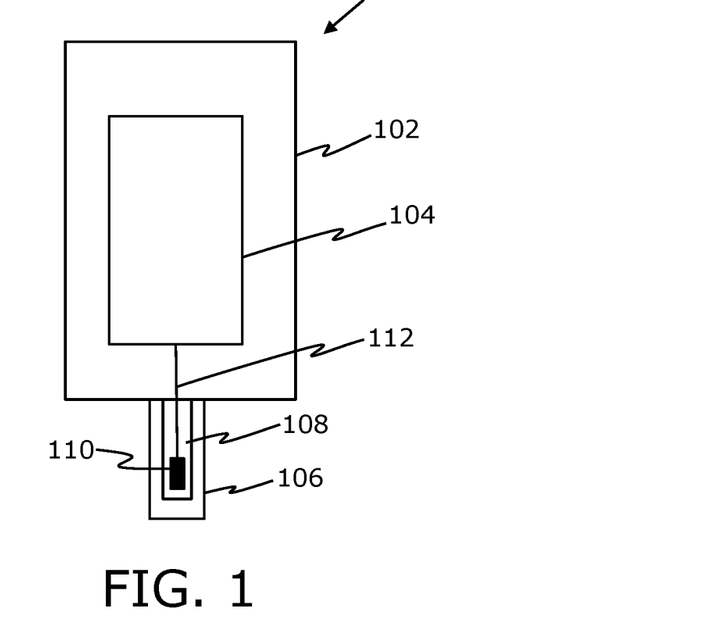
FIG. 1 is a block diagram of an acceleration transducer, in accordance with an embodiment of the present disclosure.

Referring to FIG. 1, illustrated is a block diagram of an acceleration transducer 100, in accordance with an embodiment of the present disclosure. The acceleration transducer 100 comprises a transducer body 102, an electronic assembly 104 arranged inside the transducer body 102, a fastener 106 having a cavity 108, an accelerometer 110 arranged into the cavity 108, and a communication means 112 connecting the accelerometer 110 with the electronic assembly 104.

Figure 2:
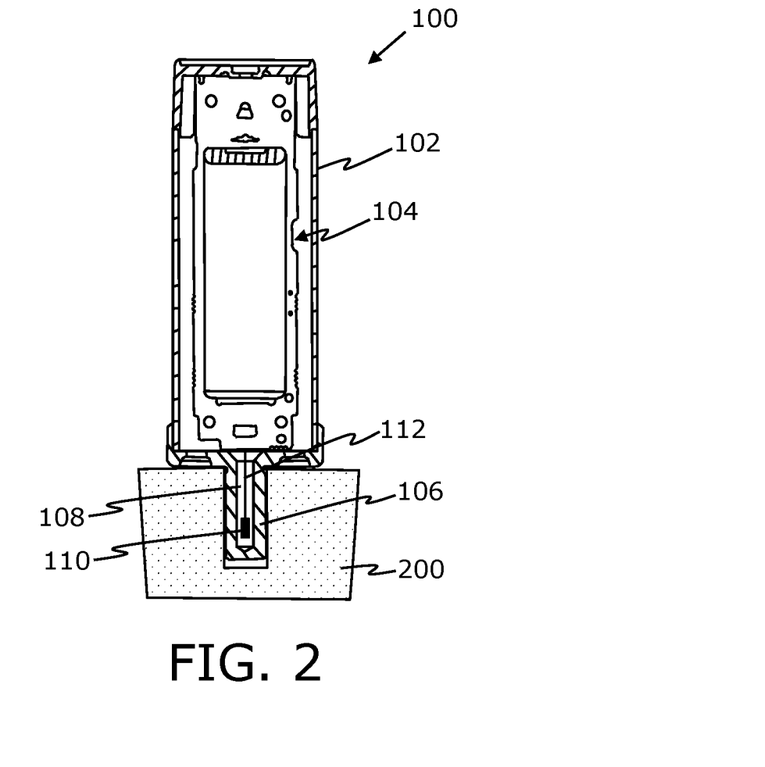
FIG. 2 is a cross-sectional schematic illustration of the acceleration transducer of FIG. 1, in accordance with an embodiment of the present disclosure.

Referring to FIG. 2, there is shown a cross-sectional schematic illustration of the acceleration transducer 100 of FIG. 1, in accordance with an embodiment of the present disclosure. FIG. 2 also illustrates the acceleration transducer 100 having the transducer body 102, the electronic assembly 104, the fastener 106 having the cavity 108, the accelerometer 110 and the communication means 112. Also shown, the fastener 106 mounting/arranging the transducer body 102 into a portion 200 of a target device (not shown) in a manner that the cavity 108 is substantially received by the portion 200.

Figure 3:
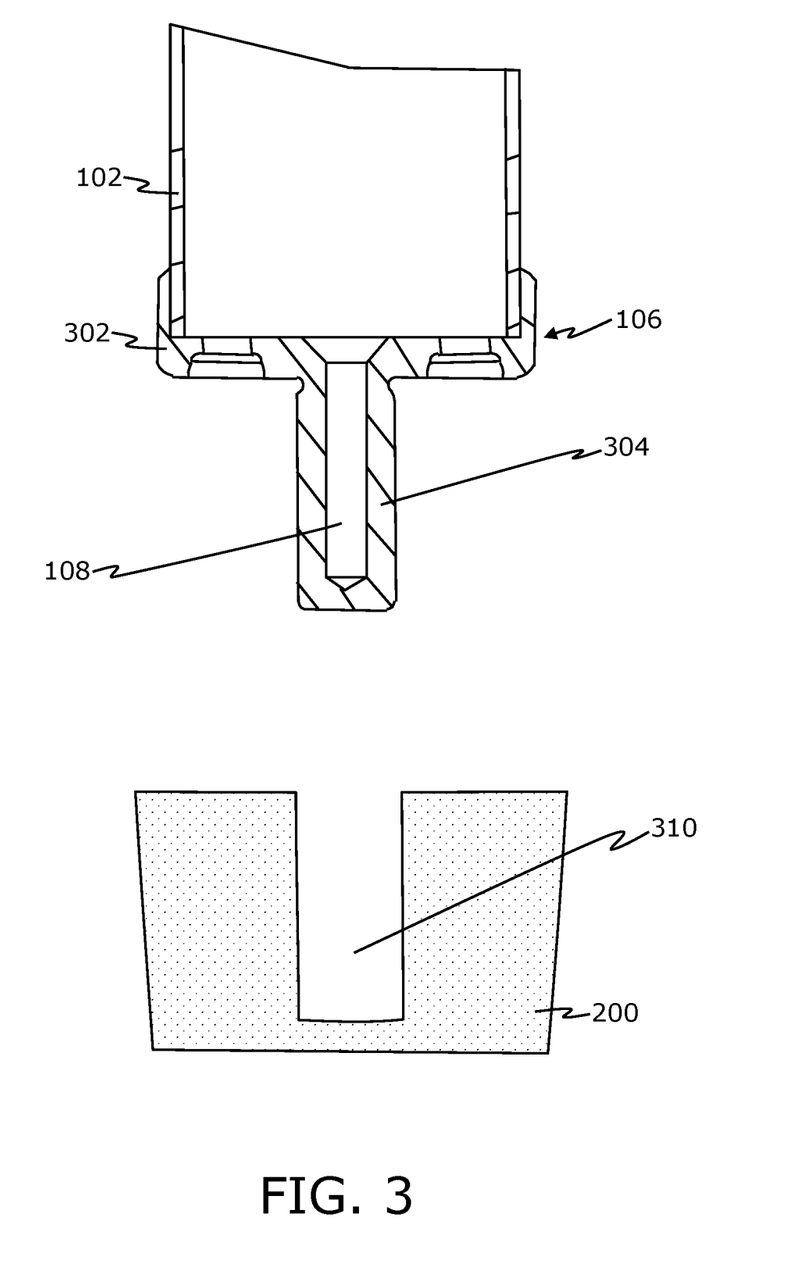
FIG. 3 is a schematic illustration of an enlarged portion of the acceleration transducer of FIG. 2 depicting a fastener thereof, in accordance with an embodiment of the present disclosure.

Referring to FIG. 3, illustrated is a schematic illustration of an enlarged portion of the acceleration transducer 100 of FIG. 2 depicting the fastener 106 thereof, in accordance with an embodiment of the present disclosure. The fastener 106 comprises a first part 302 and a second part 304 having the cavity 108. The first part 302 is coupled to the transducer body 102 and the second part 304 is coupled into the portion 200 of the target device. The fastener 106 is arrangeable into the portion of the target device, for example fitted into a socket 310 in a portion 200 of the target device.

Figure 4:
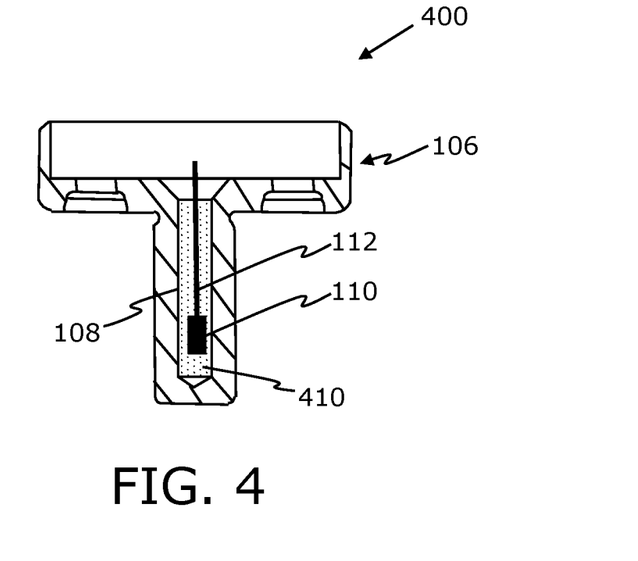
FIG. 4 is a cross-sectional schematic illustration of a fastener assembly, in accordance with an embodiment of the present disclosure.

Referring to FIG. 4, there is shown a cross-sectional schematic illustration of a fastener assembly 400 of an acceleration transducer, such as the acceleration transducer 100, in accordance with an embodiment of the present disclosure. As shown, the fastener assembly 400 comprises the fastener 106 having the cavity 108, the accelerometer 110 arranged in the cavity 108, and the communication means 112 that connects the accelerometer 110 with an electronic assembly, such as the electronic assembly 104, shown in FIGS. 1 and 2. Further, the cavity 108 is shown filled with a filler 410, with the accelerometer 110 accommodated therein.

Figure 5:
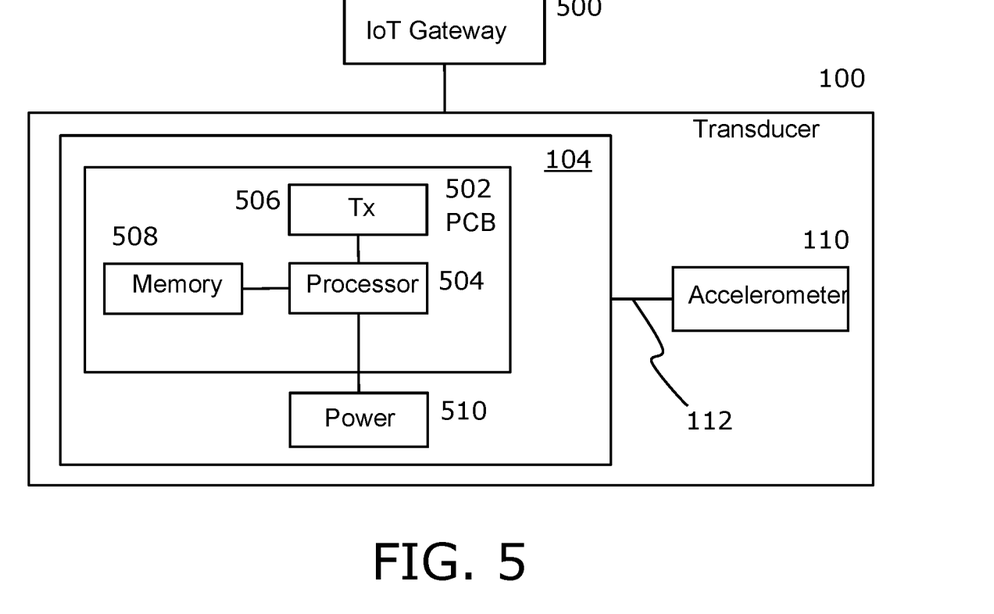
FIG. 5 is an electronic block diagram of the acceleration transducer of FIG. 1 in communication with an IoT gateway, in accordance with an embodiment of the present disclosure.

Referring to FIG. 5, there is shown an electronic block diagram of the acceleration transducer 100 of FIG. 1 in communication with an IoT gateway 500, in accordance with an embodiment of the present disclosure. As shown, the electronic assembly 104 comprises a printed circuit board 502, a processor 504, a radio transmitter 506, a memory unit 508 and a power source 510. The electronic assembly 104 is further shown connected to the accelerometer 110 via the communication means 112.

Figure 6:
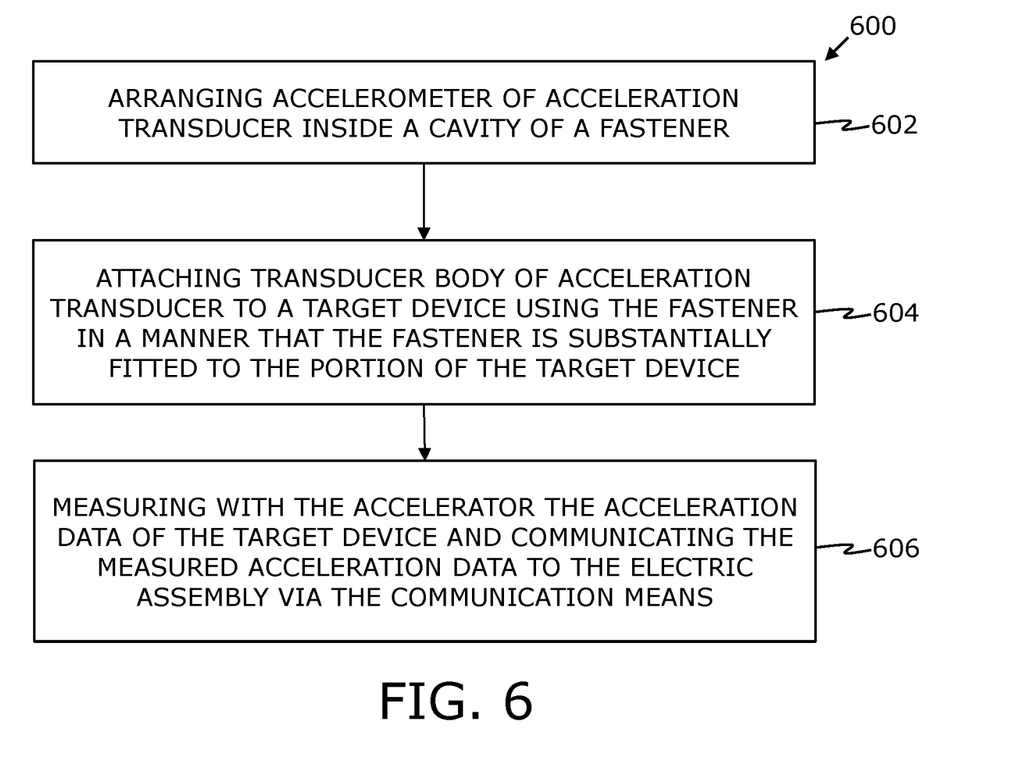
FIG. 6 is a flow chart of a method for measuring acceleration data of a target device using an acceleration transducer, in accordance with an embodiment of the present disclosure.

Referring to FIG. 6, there is shown an illustration of steps of a method 600 for measuring acceleration data of a target device using an acceleration transducer, in accordance with an embodiment of the present disclosure. At step 602, arranging an accelerometer inside a cavity of a fastener. At step 604, attaching a transducer body of the acceleration transducer into the portion of the target device using the fastener in a manner that the cavity of the fastener is substantially fitted into the portion of the target device. At step 606, measuring with the accelerator the acceleration data of the target device and communicating the measured acceleration data to the electric assembly via the communication means.

The steps 602 to 606 are only illustrative and other alternatives can also be provided where one or more steps are added, one or more steps are removed, or one or more steps are provided in a different sequence without departing from the scope of the claims herein.

Figure 7:
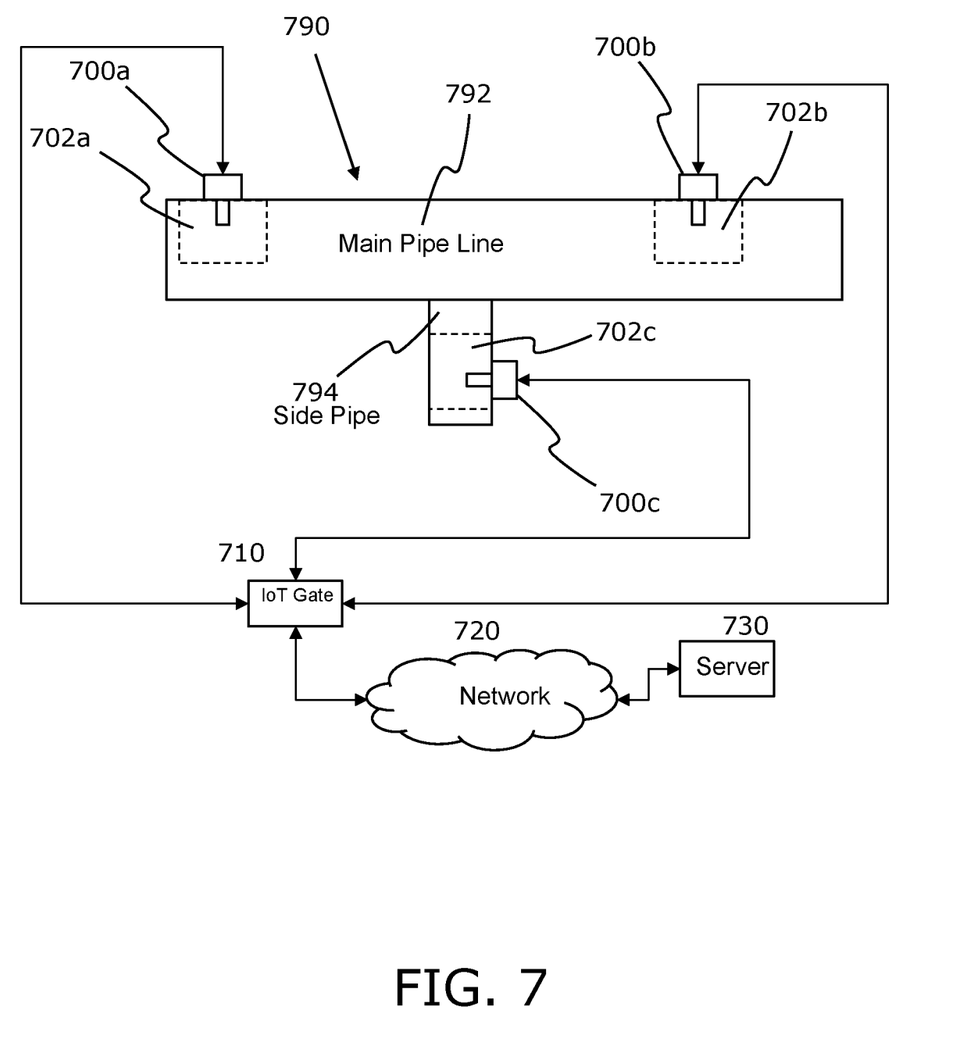
FIG. 7 is a schematic illustration of an embodiment of the present disclosure.

Referring to FIG. 7. A target device 790 is a piping system of an industrial facility. The piping system comprises a main pipe line 792 and a side pipe 794. A first accelerometer transducer 700a is arranged in a first portion 702a of the target device 790. A second accelerometer transducer 700b is arranged in a second portion 702b of the target device 790. A third accelerometer transducer 700c is arranged in a third portion 702c of the target device 790. The first, second and third accelerometer transducer transmit measured acceleration data of the target device to the IoT gateway 710. The IoT gateway provides the data further over communication network 720 to a server 730. In the server 730 the accelerometer data can be analysed to find out acceleration data of the target device (profile of accelerations in different portions and/or as single entity).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An acceleration transducer for measuring an acceleration data of a target device, the acceleration transducer comprising:
a hollow transducer body configured to accommodate an electronic assembly including a power source inside the hollow transducer body;
a fastener having a first part and a second part, the first part connecting one end of the transducer body to the fastener, the second part of the fastener having a cavity and being separated from the transducer body;
an accelerometer disposed with the cavity of the second part of the fastener;
wherein the second part of the fastener is configured to be received into a corresponding portion of the target device, the cavity of the second part of the fastener being filled with a filler that is configured to retain the accelerometer in the cavity of the second part of the fastener;
the first part of the fastener comprising a flange that is coupled to an open end of the hollow transducer body and a recess that is configured to receive the open end of the hollow transducer body;
the hollow transducer body being detachably coupled to the second part of the fastener;
wherein the accelerometer in the cavity of the second part of the fastener is separated from the hollow transducer body and the first part of the fastener and is configured to measure the acceleration data of the target device; and
a communication means connecting the accelerometer in the cavity of the second part of the fastener with the electronic assembly disposed in the hollow transducer body, the communication means configured to transmit the measured acceleration data of the target device to the electronic assembly.

2. The acceleration transducer according to claim 1, wherein the electronic assembly further comprises a printed circuit board, a processor, a radio transmitter, and a memory unit.

3. The acceleration transducer according to claim 2, wherein the radio transmitter is configured to transmit the measured acceleration data of the target device to an Internet of Things gateway.

4. The acceleration transducer according to claim 1, wherein the filler is selected from a group of epoxy-based resins, metal, polycrystalline metal, polycrystalline germanium, reinforced fibre or plastic.

5. The acceleration transducer according to claim 1 wherein the filler has thermal conductivity less than 1 W/m/K.

6. The acceleration transducer according to claim 4 wherein the filler has thermal conductivity less than 1 W/m/K.

7. The acceleration transducer according to claim 1, wherein the fastener comprises one of a screw, a bolt or a rivet.

8. The acceleration transducer according to claim 1, wherein the communication means comprises at least one of a flexible printed circuit board or a flexible wire.

9. A fastener assembly of an acceleration transducer, the fastener assembly comprising:
a fastener having a cavity, wherein the fastener is configured to be received into a portion of a target device;
wherein the fastener comprises a first part and a second part, the cavity extending through the first part and a portion of the second part;
the first part of the fastener comprising a flange that is coupled to an open end of a hollow transducer body, the hollow transducer body including an electronic assembly and a power source for the acceleration transducer;
the second part of the fastener configured to be coupled to the target device, the second part configured to couple with the open end of the hollow transducer body to close the open end of the hollow transducer body;
the hollow transducer body being detachably coupled to the second part of the fastener;
an accelerometer of the acceleration transducer disposed in the second part of the fastener, the accelerometer being separated from the hollow transducer body and the first part of the fastener, the accelerometer disposed being configured to be disposed within the target device when the second part of the fastener is coupled to the target device, the accelerometer being configured to measure an acceleration data; and a communication means connecting the accelerometer with an electronic assembly of the acceleration transducer, the communication means configured to transmit the measured acceleration data of the target device to the electronic assembly.

10. The fastener assembly according to claim 9, wherein the electronic assembly comprises a printed circuit board, a processor, a radio transmitter, a memory unit, and wherein the radio transmitter is configured to transmit the measured acceleration data to an Internet of Things gateway.

11. The fastener assembly according to claim 9, wherein the cavity is filled with a filler.

12. The fastener assembly according to claim 9, wherein the fastener comprises one of a screw, a bolt or a rivet.

13. The fastener assembly according to claim 9, wherein the communication means comprises at least one of a flexible printed circuit board or a flexible wire.

14. A method for measuring an acceleration data of a target device using an acceleration transducer, the method comprising:

arranging an accelerometer of the acceleration transducer inside a cavity of a fastener filled with a filler for retaining the accelerometer therein;

attaching the fastener into the target device with the accelerometer being disposed within the target device;

disposing an electronics assembly including a power source for the acceleration transducer in a hollow body part of the acceleration transducer;

connecting the hollow body part to a flange of a first part of the fastener and closing an open end of the hollow body part with a second part of the fastener, wherein the accelerometer is separated from the hollow transducer body;

the second part of the fastener configured to be coupled to the target device with the accelerometer disposed therein;

the hollow transducer body being detachably coupled to the second part of the fastener;

measuring with the accelerometer the acceleration data of the target device; and communicating the measured acceleration data to the electronic assembly via a communication device configured to communicate the measured acceleration data.

15. The method according to claim 14, further comprising transmitting the measured acceleration data by a radio transmitter to an Internet of Things gateway.

* * * * *